(12) United States Patent
Ye et al.

(10) Patent No.: US 10,177,661 B2
(45) Date of Patent: Jan. 8, 2019

(54) CONTROL METHOD FOR BUCK-BOOST POWER CONVERTERS

(71) Applicant: Futurewei Technologies, Inc., Plano, TX (US)

(72) Inventors: Liming Ye, Frisco, TX (US); Jinbo Huang, Guangzhou (CN); Heping Dai, Plano, TX (US); Dianbo Fu, Plano, TX (US); Daoshen Chen, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 51 days.

(21) Appl. No.: 14/739,827

(22) Filed: Jun. 15, 2015

(65) Prior Publication Data

US 2016/0365790 A1    Dec. 15, 2016

(51) Int. Cl.
*G05F 1/10* (2006.01)
*H02M 3/158* (2006.01)
*H02M 1/00* (2006.01)

(52) U.S. Cl.
CPC .. *H02M 3/1582* (2013.01); *H02M 2001/0025* (2013.01); *H02M 2001/0032* (2013.01); *H02M 2001/0058* (2013.01); *Y02B 70/1425* (2013.01); *Y02B 70/1491* (2013.01); *Y02B 70/16* (2013.01)

(58) Field of Classification Search
CPC .. H02M 3/1582; H02M 3/1563; H02M 3/156; H02M 2001/0032; Y02B 70/1466
USPC ............... 323/222, 224, 225, 271, 282–290
See application file for complete search history.

(56) References Cited

U.S. PATENT DOCUMENTS

| | | | | |
|---|---|---|---|---|
| 6,166,527 A | * | 12/2000 | Dwelley | H02M 3/1582 323/222 |
| 6,329,801 B1 | * | 12/2001 | Zuniga | H02M 3/1563 323/282 |
| 6,984,967 B2 | * | 1/2006 | Notman | H02M 3/1582 323/282 |
| 7,157,888 B2 | * | 1/2007 | Chen | H02M 3/157 323/224 |

(Continued)

FOREIGN PATENT DOCUMENTS

| | | |
|---|---|---|
| CN | 101944850 A | 1/2011 |
| CN | 102694469 A | 9/2012 |
| CN | 103280971 A | 9/2013 |

OTHER PUBLICATIONS

Stefan Waffler et al., "A Novel Low-Loss Modulation Strategy for High-Power Bidirectional Buck + Boost Converters", IEEE Transactions on Power Electronics, vol. 24, No. 6, Jun. 2009, pp. 1589-1599.

(Continued)

*Primary Examiner* — Rajnikant Patel
(74) *Attorney, Agent, or Firm* — Slater Matsil, LLP

(57) ABSTRACT

A method comprises generating a first ramp signal and a second ramp signal for controlling a buck converter portion and a boost converter portion of a buck-boost converter respectively, comparing the first ramp signal and the second ramp signal to a control signal, controlling the buck converter portion using the comparing the first ramp signal to the control signal and the boost converter portion using the comparing the second ramp signal to the control signal, comparing a current flowing through the inductor to a current threshold and terminating a switching cycle based upon the comparing the current flowing through the inductor to the current threshold.

20 Claims, 13 Drawing Sheets

(56) References Cited

U.S. PATENT DOCUMENTS

| | | | | |
|---|---|---|---|---|
| 7,453,247 B2* | 11/2008 | de Cremoux | | H02M 3/1582 |
| | | | | 323/225 |
| 7,528,587 B2* | 5/2009 | Wu | | H02M 3/1563 |
| | | | | 323/282 |
| 8,143,865 B2* | 3/2012 | Grant | | H02M 3/1582 |
| | | | | 323/222 |
| 8,269,472 B2* | 9/2012 | Lin | | H02M 3/1582 |
| | | | | 323/282 |
| 8,269,477 B2* | 9/2012 | Jo | | G05F 3/30 |
| | | | | 323/313 |
| 8,773,084 B2* | 7/2014 | Casey | | H02M 3/1582 |
| | | | | 323/225 |
| 8,841,895 B2* | 9/2014 | Prexl | | H02M 3/158 |
| | | | | 323/282 |
| 9,035,626 B2* | 5/2015 | Stratakos | | H02J 3/383 |
| | | | | 323/271 |
| 2009/0027925 A1 | 1/2009 | Kanouda et al. | | |
| 2011/0089915 A1 | 4/2011 | Qiu et al. | | |
| 2012/0032658 A1 | 2/2012 | Casey et al. | | |
| 2012/0074916 A1 | 3/2012 | Trochut | | |
| 2014/0117962 A1 | 5/2014 | Mao et al. | | |
| 2014/0217996 A1* | 8/2014 | Peker | | H02M 3/1582 |
| | | | | 323/271 |
| 2014/0354250 A1* | 12/2014 | Deng | | H02M 3/1582 |
| | | | | 323/271 |

OTHER PUBLICATIONS

Chia-Ling Wei et al., "Design of an Average-Current-Mode Noninverting Buck-Boost DC-DC Converter With Reduced Switching and Conduction Losses", IEEE Transactions on Power Electronics, vol. 27, No. 12, Dec. 2012, pp. 4934-4943.

Zhe Yu et al., "High Efficiency Bidirectional DC-DC Converter with Wide Input and Output Voltage Ranges for Battery Systems", PCIM Europe 2015, May 19-21, 2015, Nuremberg, Germany, pp. 398-405.

* cited by examiner

CONTROL METHOD FOR BUCK-BOOST POWER CONVERTERS

TECHNICAL FIELD

The present invention relates to a power converter, and, in particular embodiments, to control mechanisms for buck-boost converters.

BACKGROUND

A power converter transforms an input voltage into a regulated output voltage and supplies a current required by an external load such as integrated circuits and the like. Depending on whether a transformer is incorporated into a power converter, switching power converters can be divided into two categories, namely isolated power converters and non-isolated power converters. Isolated power converters can be implemented by using different power topologies, such as flyback converters, forward converters, half bridge converters, full bridge converters, push-pull converters, inductor-inductor-capacitor (LLC) resonant converters and the like. Likewise, non-isolated power converters can be implemented by using different power topologies such as buck converters, boost converters, buck-boost converters, linear regulators, any combinations thereof.

As the demand for battery based power applications has grown recently, there has grown a need for developing a converter capable of generating a regulated output voltage from an input voltage, which may be larger than, equal to, or smaller than the output voltage. For example, in a battery based power application, when a battery is fresh, it may supply a voltage higher than the output voltage of the converter. On the other hand, when the battery is depleted, it may supply a voltage lower than the output voltage of the converter.

Buck-boost converters have emerged as an effective power conversion scheme to deliver a tightly regulated output voltage from a wide range input voltage. A buck-boost converter can produce an output voltage that is either greater than or less than an input voltage through using different operating modes such as buck and boost conversion modes. In particular, the buck-boost converter operates in a buck mode when the input voltage is higher than the output voltage, in a boost mode when the input voltage is lower than the output voltage.

SUMMARY OF THE INVENTION

These and other problems are generally solved or circumvented, and technical advantages are generally achieved, by preferred embodiments of the present invention which provide a method for achieving a high efficiency non-isolated power converter.

In accordance with an embodiment, a method comprises generating a first ramp signal for controlling a buck converter portion of a buck-boost converter, wherein the buck-boost converter comprises a first high-side switch and a first low-side switch connected in series across an input capacitor, a second high-side switch and a second low-side switch connected in series across an output capacitor and an inductor coupled between a common node of the first high-side switch and the first low-side switch, and a common node of the second high-side switch and the second low-side switch.

The method further comprises generating a second ramp signal for controlling a boost converter portion of the buck-boost converter, comparing the first ramp signal and the second ramp signal to a control signal, controlling a state of the first high-side switch using the comparing the first ramp signal to the control signal and a state of the second low-side switch using the comparing the second ramp signal to the control signal, comparing a current flowing through the inductor to a current threshold and terminating a switching cycle based upon the comparing the current flowing through the inductor to the current threshold.

In accordance with another embodiment, a method comprises providing a power converter, wherein the power converter comprises a buck converter portion comprising a first high-side switch and a first low-side switch connected in series across an input capacitor, a boost converter portion comprising a second high-side switch and a second low-side switch connected in series across an output capacitor and an inductor coupled between a common node of the first high-side switch and the first low-side switch, and a common node of the second high-side switch and the second low-side switch.

The method further comprising detecting an input voltage and an output voltage of the power converter, comparing a first ramp signal and a second ramp signal to a control signal, controlling a state of the first high-side switch using the comparing the first ramp signal to the control signal and a state of the second low-side switch using the comparing the second ramp signal to the control signal, determining an operation mode transition based upon a ratio of the input voltage to the output voltage, comparing a current flowing through the inductor to a current threshold and terminating a switching cycle based upon the comparing the current flowing through the inductor to the current threshold.

In accordance with yet another embodiment, a converter comprises a buck converter portion comprising a first high-side switch and a first low-side switch connected in series across an input capacitor, a boost converter portion comprising a second high-side switch and a second low-side switch connected in series across an output capacitor, and an inductor coupled between the buck converter portion and the boost converter portion.

The converter further comprises a controller configured to compare a current flowing through the inductor to a current threshold and terminate a switching cycle based upon comparing the current flowing through the inductor to the current threshold.

An advantage of a preferred embodiment of the present invention is the efficiency of a buck-boost converter may be improved by employing multiple operating modes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely control methods for a high efficiency buck-boost converter. Hereinafter, various embodiments will be explained in detail with reference to the accompanying drawings.

Figure 1:
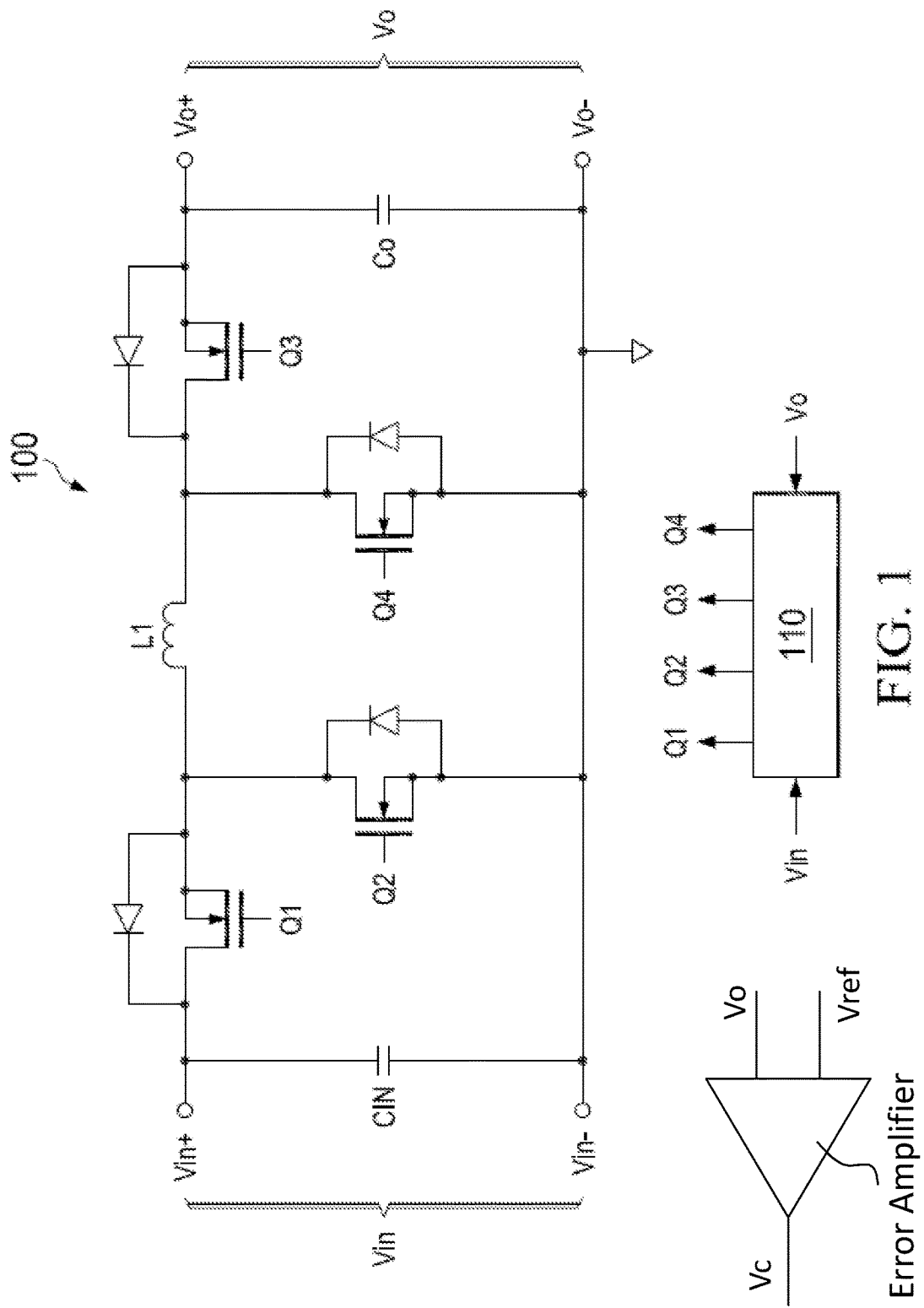
FIG. 1 illustrates a schematic diagram of a buck-boost converter in accordance with various embodiments of the present disclosure.

FIG. 1 illustrates a schematic diagram of a buck-boost converter in accordance with various embodiments of the present disclosure. The buck-boost converter 100 comprises a first high-side switch Q1, a first low-side switch Q2, a second high-side switch Q3, a second low-side switch Q4 and an inductor L1. The first high-side switch Q1 and the first low-side switch Q2 are connected in series between the positive terminal and the negative terminal of an input capacitor CIN. The second high-side switch Q3 and the second low-side switch Q4 are connected in series between the positive terminal and the negative terminal of an output capacitor Co. The inductor L1 is coupled between the common node of the first high-side switch Q1 and the first low-side switch Q2, and the common node of the second high-side switch Q3 and the second low-side switch Q4.

The buck-boost converter 100 may further comprise a controller 110. As shown in FIG. 1, the controller 110 may detect the input voltage Vin and the output voltage Vo, and generate a plurality of gate drive signals for driving switches Q1, Q2, Q3 and Q4 accordingly. The controller 110 may be a PWM controller. Alternatively, the controller 110 may be implemented as a digital controller such as a micro-controller, a digital signal processor and/or the like.

It should be noted that while the example throughout the description is based upon a buck-boost converter and a controller configured to generate gate drive signal for the buck-boost converter (e.g., buck-boost converter shown in FIG. 1), the buck-boost converter 100 as well as the controller 110 shown in FIG. 1 may have many variations, alternatives, and modifications. For example, the controller 110 may detect other necessary signals such as the input and/or output current of the buck-boost converter 100. Furthermore, there may be one dedicated driver or multiple dedicated drivers coupled between the controller 110 and the switches Q1, Q2, Q3 and Q4. In sum, the buck-boost converter 100 and the controller 110 illustrated herein is limited solely for the purpose of clearly illustrating the inventive aspects of the various embodiments. The present invention is not limited to any particular power topology.

The buck-boost converter 100 may be divided into two portions, namely a buck converter portion and a boost converter portion. The buck converter portion may comprise the first high-side switch Q1 and the first low-side switch Q2. The buck converter portion and the inductor L1 may function as a step-down converter. On the other hand, the boost converter portion may comprise the second high-side switch Q3 and second low-side switch Q4. The boost converter portion and the inductor L1 may function as a step-up converter. The buck converter portion, the inductor L1 and the boost converter portion are connected in cascade between the input capacitor CIN and the output capacitor Co.

The switches (e.g., the first high-side switch Q1) shown in FIG. 1 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 1 illustrates four switches Q1, Q2, Q3, and Q4, various embodiments of the present disclosure may include other variations, modifications and alternatives. For example, the low-side switch Q2 may be replaced by a freewheeling diode and/or the like. The high-side switch Q3 may be replaced by a rectifier diode and/or the like.

Based upon different design needs, three control mechanisms may be employed to operate the buck-boost converter 100. In a first control mechanism, depending on different input voltages, the buck-boost converter 100 is configured to operate in three different operating modes, namely a buck operating mode, a boost operating mode and a buck-boost operating mode. The detailed operating principles of the first control mechanism will be described below with respect to FIGS. 2-5.

In a second control mechanism, the buck-boost converter 100 is configured to operate in a buck-boost operating mode. The buck converter portion includes switches Q1 and Q2. In the buck-boost operating mode under the second control mechanism, Q1 and Q2 are controlled by complementary gate drive signals with appropriate switching dead times in the same manner as in a convention buck converter. The boost converter portion includes switches Q3 and Q4. In the buck-boost operating mode under the second control mechanism, Q3 and Q4 are controlled by complementary gate drive signals with appropriate switching dead times in the same manner as in a convention boost converter. The detailed operating principles of the second control mechanism will be described below with respect to FIGS. 6-9.

In a third control mechanism, the buck-boost converter 100 is configured to operate in three different operating modes, namely a buck operating mode, a boost operating mode and a buck-boost operating mode. The detailed operating principles of the third control mechanism will be described below with respect to FIG. 10-13.

The three control mechanisms described above are based upon boundary current mode (BCM) control. The BCM control technique may help the buck-boost converter 100 achieve zero voltage switching (ZVS) in different operating modes (e.g., buck operating modes, boost operating modes and buck-boost operating modes). The ZVS operation of the buck-boost converter 100 may reduce the switching losses and improve the efficiency of the buck-boost converter 100.

Figure 2:
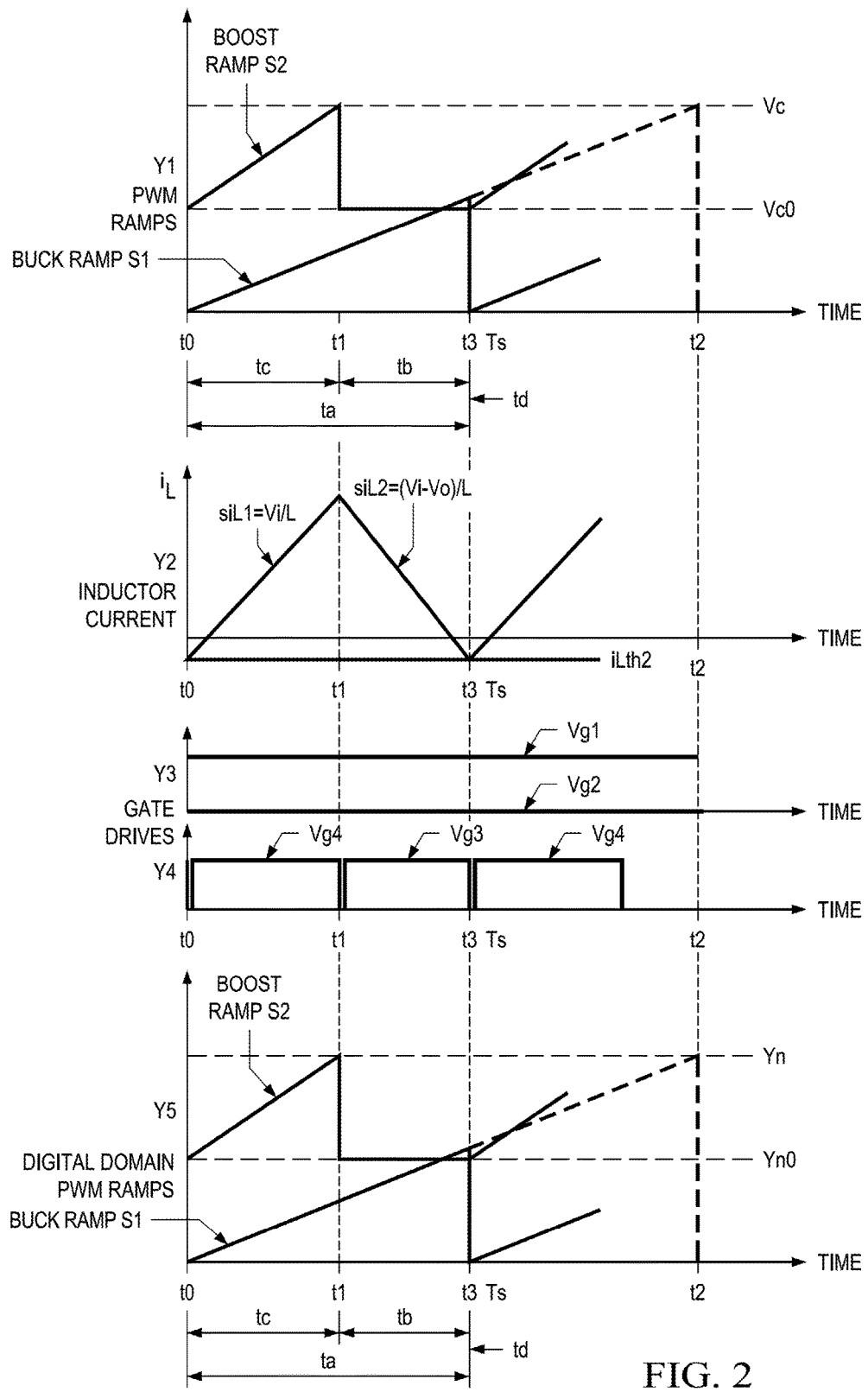
FIG. 2 illustrates timing diagrams associated with a boost operating mode under the first control mechanism in accordance with various embodiments of the present disclosure.

FIG. 2 illustrates timing diagrams associated with a boost operating mode under the first control mechanism in accordance with various embodiments of the present disclosure. The horizontal axis of FIG. 2 represents intervals of time. There are five vertical axes. The first vertical axis Y1 represents the ramps for controlling the buck-boost converter 100. The second vertical axis Y2 represents the current flowing through the inductor L1 of the buck-boost converter 100. The third vertical axis Y3 represents the gate drive signals of switches Q1 and Q2. The fourth vertical axis Y4 represents the gate drive signals of switches Q3 and Q4. The fifth vertical axis Y5 represents a corresponding control scheme in the digital domain.

The boost operating mode is employed when the output voltage (e.g., Vo=74 V) of the buck-boost converter 100 is greater the input voltage (e.g., Vin=36 V) of the buck-boost converter 100. In operation, each new switching cycle starts at the time instant t0. At t0, both the high-side switch Q1 of the buck converter portion and the low-side switch Q4 of the boost converter portion are turned on. A first ramp S1 is employed to control the operation of the buck converter portion and a second ramp S2 is employed to control the operation of the boost converter portion.

As shown in FIG. 2, at the beginning of a switching cycle, the first ramp S1 starts from t0 and ramps up until at the end of the switching cycle. The first ramp S1 is reset at t3. In some embodiments, t3 is the end of the switching cycle. The operation of the high-side switch Q1 is controlled by the first ramp S1. In particular, the high-side switch Q1 is turned on at t0 and remains on until the peak value of the first ramp S1 is equal to an error amplifier output voltage Vc. In some embodiments, the error amplifier (not shown) has a first input coupled to the output voltage Vo of the buck-boost converter 100 and a second input connected to a reference voltage.

In the boost operating mode, the output voltage Vo is greater than the input voltage Vin. The intersection point (e.g., t2) of the first ramp S1 and Vc is far beyond the end of the switching cycle determined by the inductor current. Since the first ramp S1 is reset to zero at t3 and never reaches Vc as indicated by the dashed line portion of S1, the high-side switch Q1 is not turned off and stays always on during the boost operating mode.

The second ramp S2 includes an offset Vc0, which is a predetermined value. At the beginning of each switching cycle, the second ramp S2 starts to ramp up from Vc0 and the low-side switch Q4 of the boost converter portion is turned on. The low-side switch Q4 of the boost converter portion remains on until the second ramp S2 crosses the error amplifier output voltage Vc. As shown in FIG. 2, at t1, the low-side switch Q4 is turned off and the second ramp S2 is reset to Vc0.

From t0 to t1, since both Q1 and Q4 are turned on, the input voltage Vin of the buck-boost converter 100 is applied to the inductor L1. As a result, the inductor current ramps up from a negative value to a peak current from t0 to t1. The ramp-up slope of the inductor current is equal to the input voltage Vin divided by the inductance of L1.

During the period from t1 to t3, Q4 is turned off and Q3 is turned on. Since both Q1 and Q3 are on, the voltage difference between Vo and Vin is applied to the inductor L1. Since the buck-boost converter 100 operates in the boost operating mode during t1 to t3, the output voltage Vo is greater than the input voltage Vin. As a result, during the period from t1 to t3, a negative voltage is applied to the inductor L1 and the inductor current ramps down accordingly as shown in FIG. 2. The ramp-down slope of the inductor current is equal to the difference of the input voltage Vin and the output voltage Vo divided by the inductance of L1. At the time instant t3, the inductor current drops to a current threshold iLth2. Q3 is turned off and Q4 is turned on.

In some embodiments, the current threshold iLth2 is a predetermined value. Depending on different applications and design needs, iLth2 may vary. In some embodiments, iLth2 is a negative value as shown in FIG. 2. Furthermore, iLth2 may be set to a low enough value to ensure the boost converter portion of the buck-boost converter 100 achieves ZVS at t3 and the buck converter portion of the buck-boost converter 100 achieves ZVS at the beginning of the next switching cycle. It should be noted the ZVS operation shown in FIG. 2 is merely an example. There may be alternatives, variations and modifications. For example, by monitoring the switching node voltage directly or indirectly (e.g., using an auxiliary voltage sense winding on L1) inside a short time window during which Q3 is turned off and Q4 is turned on around t3, and Q2 is turned off and Q1 is turned on around the end of the switching cycle. Furthermore, by varying the switching period, the ZVS operation can be achieved over different line and load conditions.

In the digital control domain, as shown in FIG. 2, the error amplifier output voltage Vc is implemented as Yn. Yn is in a range from 0 to 1. The offset Vc0 is implemented as Yn0; S1 and S2 are PWM ramp slopes generated by a digital power controller. In some embodiments, Ts is the switching period of the buck-boost converter 100; ta is equal to Yn divided by S1; the ratio of Vo to Vin is equal to the ratio of ta to tb; tc is equal to the difference of Yn and Yn0 divided by S2.

As shown in FIG. 2, when the buck-boost converter 100 operates in the boost operating mode, Yn is greater than Yn0; ta is equal to t2; tb is equal to the difference of t3 and t1; ta is equal to Ts; the sum of tb and tc is equal to Ts.

It should be noted that some feed-forward control mechanisms may be employed to further improve the performance (e.g., transient response) of the boost operating mode. In particular, the input voltage Vin and/or the output voltage Vo may be added into the slopes. For example, S1 is equal to k1 divided by Vin where k1 is a first predetermined constant. S2 is equal to k2 divided by Vin where k2 is a second predetermined constant.

Figure 3:
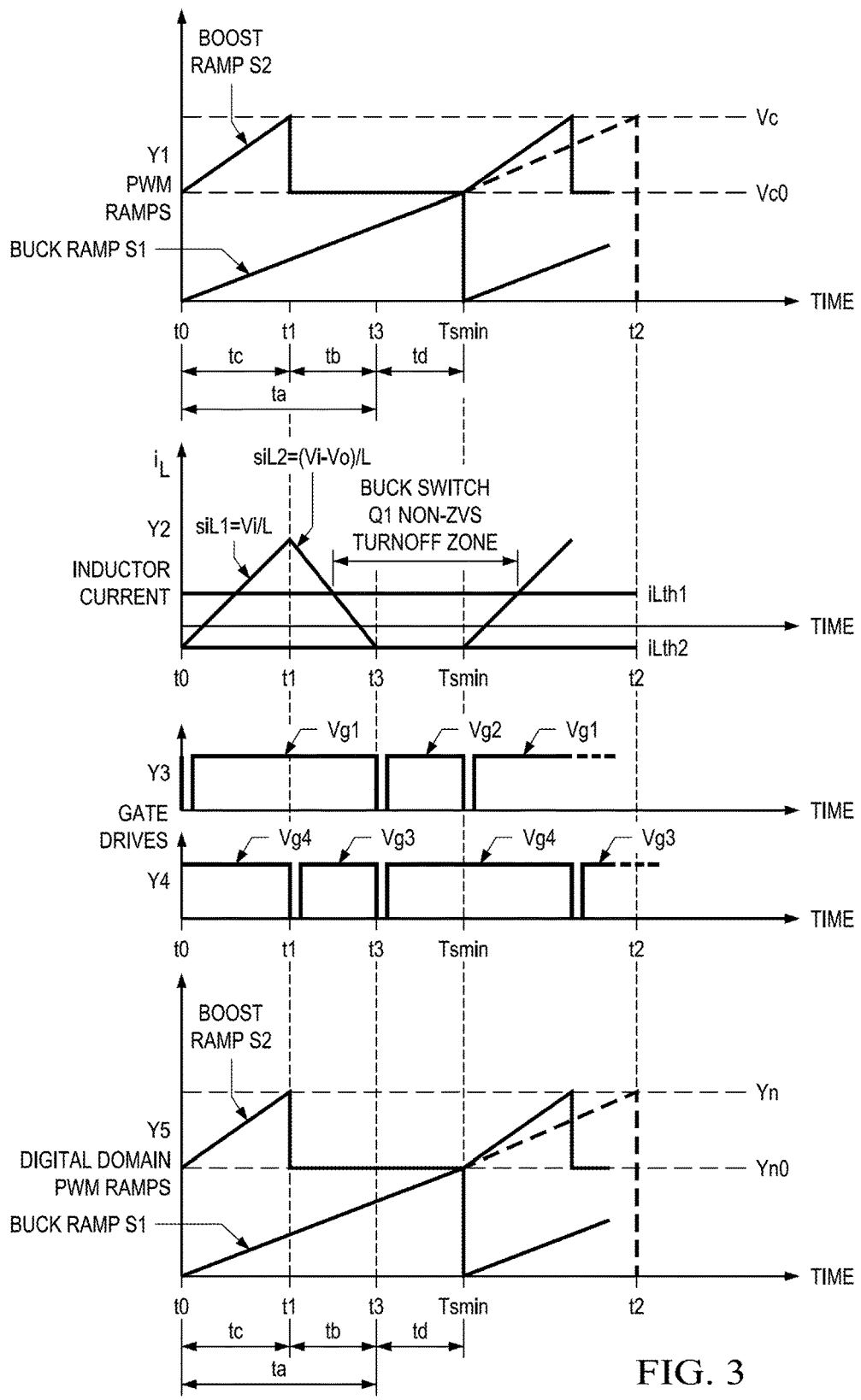
FIG. 3 illustrates timing diagrams associated with a light-load boost operating mode under the first control mechanism in accordance with various embodiments of the present disclosure.

FIG. 3 illustrates timing diagrams associated with a light-load boost operating mode under the first control mechanism in accordance with various embodiments of the present disclosure. The timing diagrams shown in FIG. 3 are similar to those shown in FIG. 2 except that the buck-boost converter 100 operates in a light load condition. In some embodiments, the light load is defined as a load less than 10% of the full load of the buck-boost converter 100. Since the ramp-up current slope and the ramp-down current slope shown in FIG. 3 are the same as those shown in FIG. 2, the switching period under the light load condition shown in FIG. 3 is shorter in comparison with that shown in FIG. 2 in order to achieve a lower average current flowing through the inductor L1. As a result, the effective switching frequency of the buck-boost converter 100 may be relatively high for light load.

In order to control the range of the switching frequency of the buck-boost converter 100, a predetermined minimum switching period Tsmin may be implemented to limit the light load switching frequency. As shown in FIG. 3, the second ramp S2 does not start to ramp until Tsmin. During the period from t3 to Tsmin, it is a delay time td in which Q4 is on and remains the on state until the second ramp S2 reaches the error amplifier output voltage Vc. During td, Q2 and Q4 are both turned on and the inductor current freewheels in a loop formed by L1, Q2 and Q4.

It should be noted the delay time td shown in FIG. 3 is applicable to the operating mode shown in FIG. 2. For example, in order to have a fixed switching frequency, a delay time may be added at t3. In other words, both the buck ramp and the boost ramp may not ramp up at t3. A new switching period starts at the end of the delay time td.

In the digital control domain, the control mechanism shown in FIG. 3 is similar to that shown in FIG. 2, and hence is not discussed in further detail herein to avoid unnecessary repetition.

Figure 4:
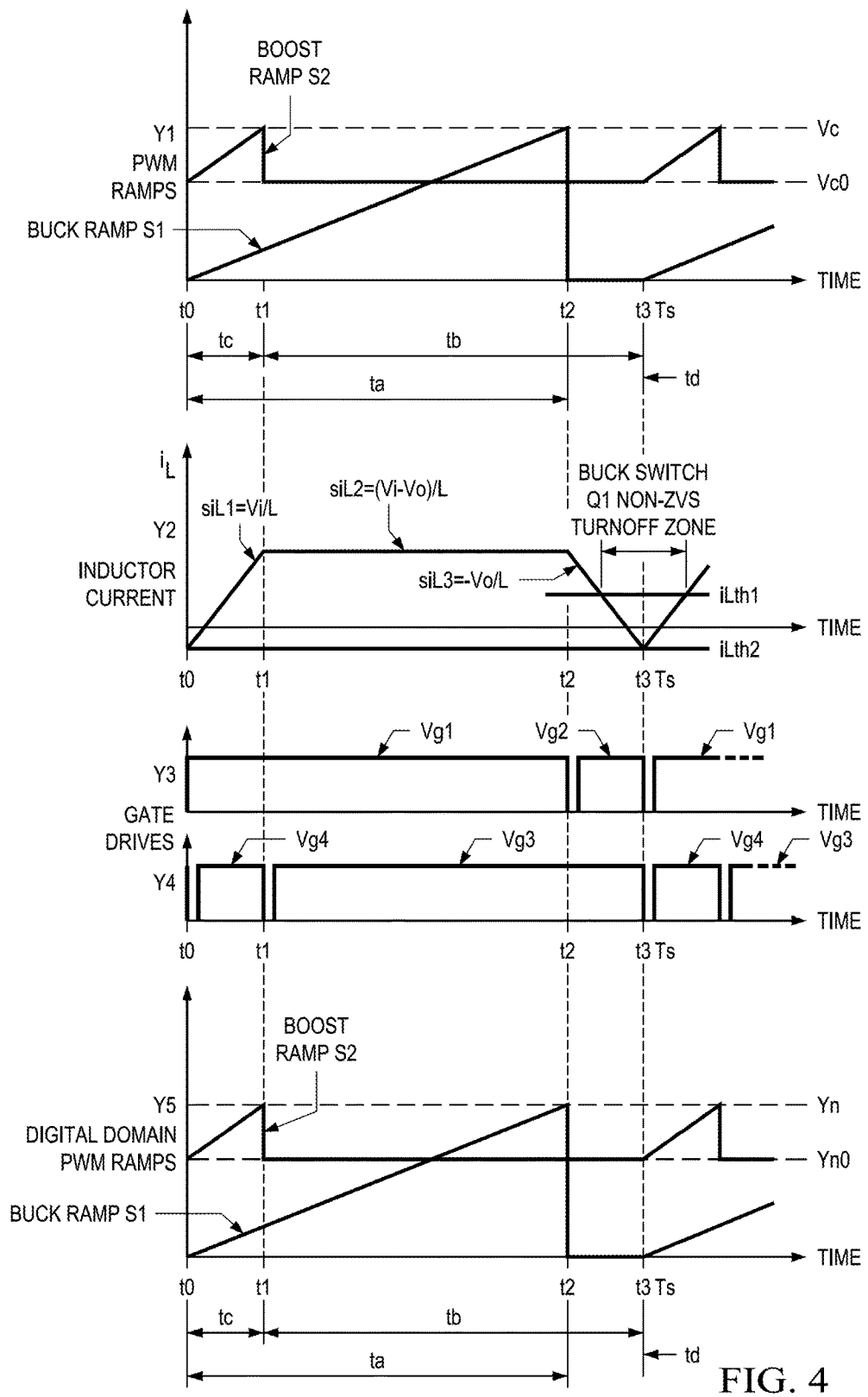
FIG. 4 illustrates timing diagrams associated with a buck-boost operating mode under the first control mechanism in accordance with various embodiments of the present disclosure.

FIG. 4 illustrates timing diagrams associated with a buck-boost operating mode under the first control mechanism in accordance with various embodiments of the present disclosure. The buck-boost operating mode is employed when the input voltage (e.g., Vin=48 V) of the buck-boost converter 100 is approximately equal to the output voltage (e.g., Vo=48 V) of the buck-boost converter 100. In operation, each new switching cycle starts at the time instant t0.

At t0, both the high-side switch Q1 of the buck converter portion and the low-side switch Q4 of the boost converter portion are turned on.

As shown in FIG. 4, at the beginning of each switching cycle, the first ramp S1 starts from t0 and ramps up until the first ramp S1 reaches the error amplifier output voltage Vc at t2. The first ramp S1 is reset at t2 and starts to ramp up at the beginning of the next cycle at t3. The operation of the high-side switch Q1 is controlled by the first ramp S1. In particular, the high-side switch Q1 is turned on at t0 and remains on until the peak value of the first ramp S1 is equal to the error amplifier output voltage Vc at t2. The low-side switch Q2 is turned on at t2 and remains on until the end of the cycle at t3.

The second ramp S2 includes the offset Vc0. At the beginning of each switching cycle, the second ramp S2 starts to ramp up and the low-side switch Q4 of the boost converter portion is turned on. The low-side switch Q4 of the boost converter portion remains on until the peak value of the second ramp S2 is equal to the error amplifier output voltage Vc. As shown in FIG. 4, at t1, the low-side switch Q4 is turned off and the second ramp S2 is reset to Vc0. At t1, the high-side switch Q3 is turned on and remains on until the end of the cycle at t3. It should be noted that there is a dead time between the turn-off of Q4 and the turn-on of Q3.

From t0 to t1, since both Q1 and Q4 are turned on, the input voltage Vin is applied to the inductor L1. As a result, the inductor current ramps up from a negative value to a peak current from t0 to t11. The ramp-up slope of the inductor current is equal to the input voltage Vin divided by the inductance of L1. During the period from t1 to t2, Q4 is turned off and Q3 is turned on. Since both Q1 and Q3 are on, the voltage difference between Vo and Vin is applied to the inductor L1. Since the input voltage of the buck-boost converter 100 is approximately equal to the output voltage of the buck-boost converter 100, the inductor current remains relatively flat during the period from t1 to t2 as shown in FIG. 4.

During the period from t2 to t3, Q1 is turned off and Q2 is turned on. Since both Q2 and Q3 are on, the voltage Vo is applied to the inductor L1. As a result, the inductor current ramps down. The ramp-down slope of the inductor current is equal to the output voltage Vo divided by the inductance of L1. At time instant t3, the inductor current drops to the current threshold iLth2. Q3 is turned off and Q4 is turned on.

It should be noted that the buck stage of the buck-boost converter 100 may not achieve zero voltage switching if Q1 is turned off within the non-ZVS turn-off zone shown in FIG. 4. The range of the non-ZVS turn-off zone is determined by a current threshold iLth1, which is a predetermined value.

It should be noted a delay time td may be added as shown in FIG. 4. For example, in order to have a fixed switching frequency, the delay time td may be added at t3. In other words, both the buck ramp and the boost ramp may not ramp up at t3. Instead, the buck ramp and the boost ramp may start at the end of the delay time td. Depending on different applications and design needs, td may vary. For example, a variable td may help the buck-boost converter 100 achieve a fixed switching frequency.

In the digital control domain, the control mechanism shown in FIG. 4 is similar to that shown in FIG. 2 except that Ts is greater than to as shown in FIG. 4. The detailed operating principle of the buck-boost operating mode in the digital control domain is not discussed herein to avoid repetition.

Figure 5:
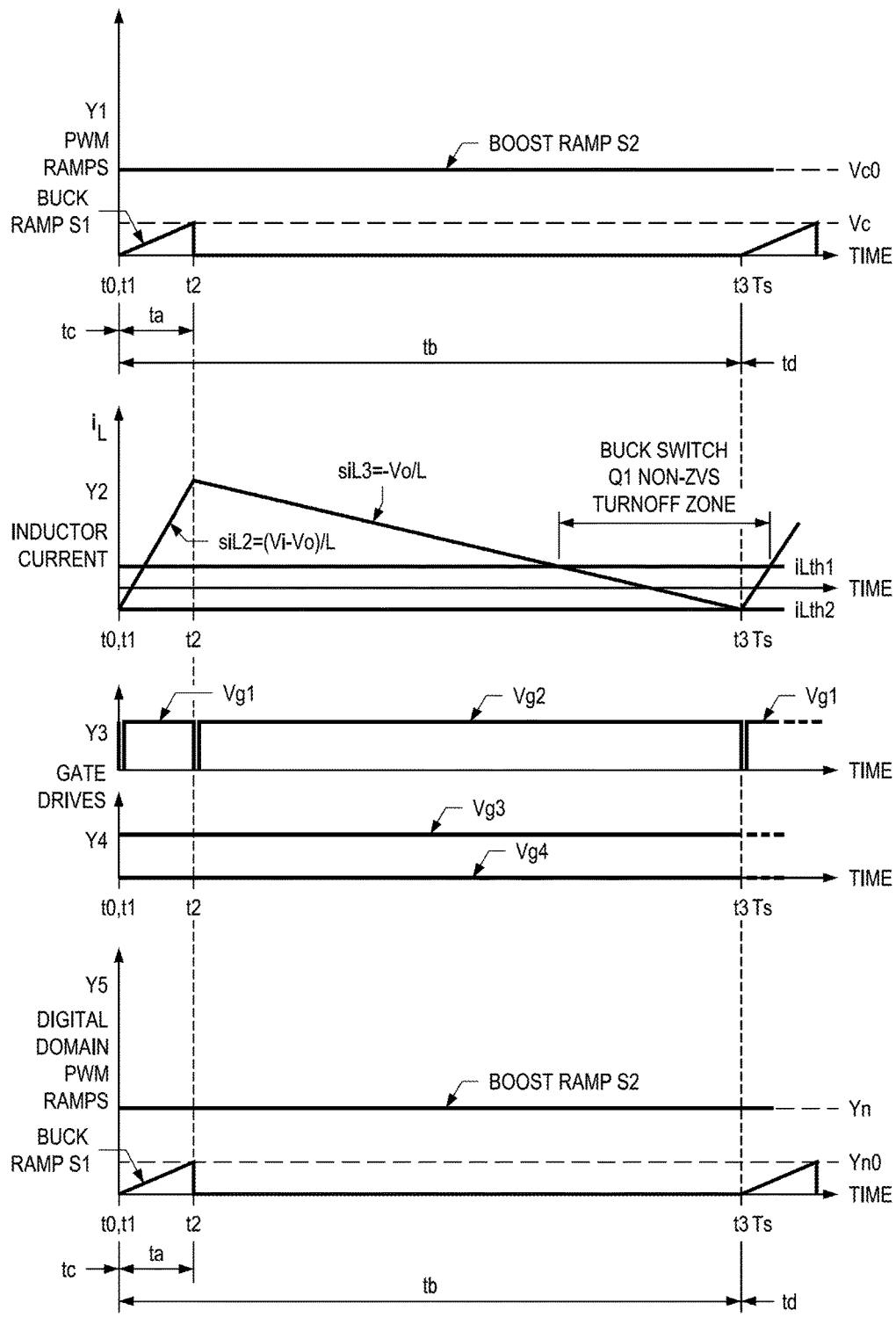
FIG. 5 illustrates timing diagrams associated with a buck operating mode under the first control mechanism in accordance with various embodiments of the present disclosure.

FIG. 5 illustrates timing diagrams associated with a buck operating mode under the first control mechanism in accordance with various embodiments of the present disclosure. The buck operating mode is employed when the input voltage (e.g., Vin=60 V) of the buck-boost converter 100 is greater than the output voltage (e.g., Vo=8 V) of the buck-boost converter 100. In operation, each new switching cycle starts at the time instant t0. At t0, the high-side switch Q1 of the buck converter portion is turned on.

A first ramp S1 is employed to control the operation of the buck converter portion and a second ramp S2 is employed to control the operation of the boost converter portion. In the buck operating mode, the second ramp S2 is a horizontal line with no slope since this ramp is constantly being reset to Vc0. As shown in FIG. 5, the Y1-axis value of the horizontal line is equal to Vc0.

At the beginning of each switching cycle, the first ramp S1 starts from t0 and ramps up until it is reset at t2. The operation of the high-side switch Q1 is controlled by the first ramp S1. In particular, the high-side switch Q1 is turned on at t0 and remains on until the peak value of the first ramp S1 is equal to an error amplifier output voltage Vc. At t2, Q1 is turned off and Q2 is turned on as shown in FIG. 5.

As shown in FIG. 5, in the buck operating mode, Vc0 is greater than Vc. In other words, the second ramp S2 never reaches Vc during the buck operating mode. Since the second ramp S2 never reaches Vc, the low side-switch Q4 of the boost converter portion is never on and the high-side switch Q3 of the boost converter portion stays always on during the buck operating mode.

From t0 to t2, since both Q1 and Q3 are turned on, the difference of the input voltage Vin and the output voltage Vo is applied to the inductor L1. Since the input voltage Vin is greater than the output voltage Vo during the buck operating mode, the inductor current ramps up from a negative value to a peak current from t0 to t2. The ramp-up slope of the inductor current is equal to the difference of the input voltage Vin and the output voltage Vo divided by the inductance of L1.

During the period from t2 to t3, Q1 is turned off and Q2 is turned on. Since both Q2 and Q3 are on, the voltage Vo is applied to the inductor L1. As a result, the inductor current ramps down. The ramp-down slope of the inductor current is equal to the output voltage Vo divided by the inductance of L1. At time instant t3, the inductor current drops to the current threshold iLth2. Q2 is turned off and Q1 is turned on.

It should be noted a delay time td may be added as shown in FIG. 5. For example, in order to have a fixed switching frequency, the delay time td may be added at t3. In other words, the buck ramp may not ramp up at t3. Instead, the buck ramp may start at the end of the delay time td.

In the digital control domain, the control mechanism shown in FIG. 5 is similar to that shown in FIG. 2 except that Yn0 is greater than Yn; Ts is greater than ta; Ts is equal to tb; tc is equal to zero. The detailed operating principle of the buck operating mode in the digital control domain is not discussed herein to avoid repetition.

In FIGS. 3-5, the horizontal axis value of the intersection point of the inductor current and iLth2 is t3. Depending on different operating modes, t3 can be the turn-off time of the high-side switch Q3 of the boost converter portion and/or the turn-off time of the low-side switch Q2 of the buck converter portion, or the turn-off time of the high-side switch Q1 of the buck converter portion.

In some embodiments, the delay time td is inserted between t3 and the beginning of the following switching cycle. When the switching period is greater than the minimum switching period, td is set to zero. As a result, t3 is the end of the switching period. On the other hand, when the buck-boost converter 100 operates under a light load condition, the minimum switching period is greater than t3. td is employed to ensure the actual switching period is greater than the minimum switching period. The minimum switching period is a predetermined value and may vary depending on different applications and design needs. In addition, under BCM control, the switching frequency of the buck-boost converter 100 may vary depending on different line and load conditions. The delay time td may also be employed to achieve a fixed switching frequency under different line and load conditions.

The transition between the buck operating mode and the buck-boost operating mode, and the transition between the boost operating mode and the buck-boost operating mode, are automatically controlled by the control loop which determines Vc, and a smooth transition can be achieved by setting appropriate values for ramps S1, S2 and Vc0. In alternative embodiments, the operating mode transitions can be determined by comparing the input voltage Vin and the output voltage Vo. For example, according to a predetermined lookup table, the buck-boost converter 100 should enter a buck-boost operating mode when the ratio of the input voltage Vin to the output voltage Vo is equal to a value in the lookup table. At the same time, the control loop's output indicates the buck-boost converter 100 should enter a buck operating mode. The control scheme based upon the lookup table overrides the control scheme based upon the control loop.

Figure 6:
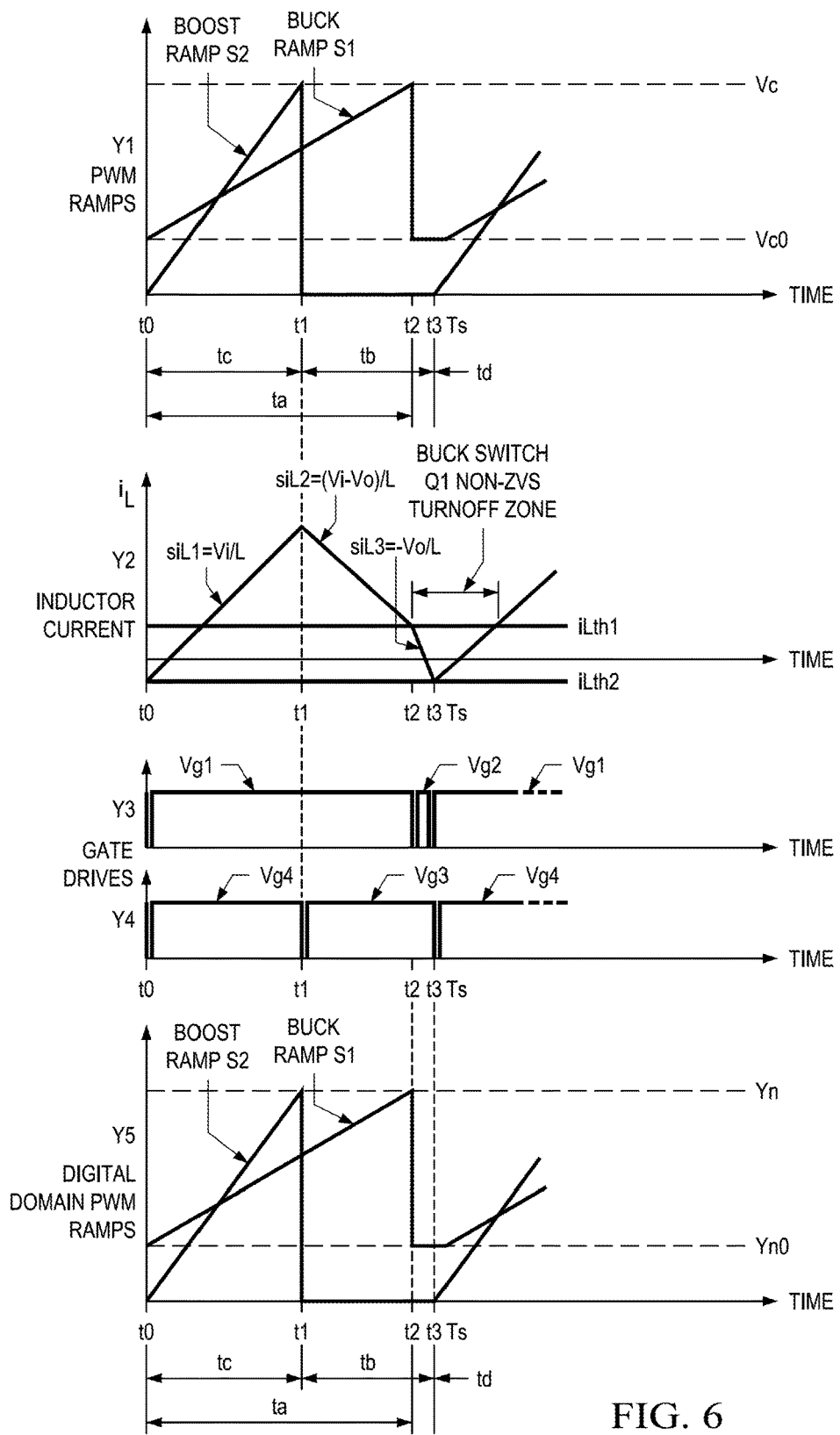
FIG. 6 illustrate timing diagrams associated with a buck-boost operating mode under the second control mechanism when the output voltage is greater than the input voltage in accordance with various embodiments of the present disclosure.

FIG. 6 illustrates timing diagrams associated with a buck-boost operating mode under the second control mechanism when the output voltage is greater than the input voltage in accordance with various embodiments of the present disclosure. The horizontal axis of FIG. 6 represents intervals of time. There are five vertical axes. The first vertical axis Y1 represents the ramps for controlling the buck-boost converter 100. The second vertical axis Y2 represents the current flowing through the inductor L1 of the buck-boost converter 100. The third vertical axis Y3 represents the gate drive signals of switches Q1 and Q2. The fourth vertical axis Y4 represents the gate drive signals of switches Q3 and Q4. The fifth vertical axis Y5 represents a corresponding control scheme in the digital domain.

In operation, each new switching cycle starts at the time instant t0. At t0, both the high-side switch Q1 of the buck converter portion and the low-side switch Q4 of the boost converter portion are turned on. A first ramp S1 is employed to control the operation of the buck converter portion and a second ramp S2 is employed to control the operation of the boost converter portion. The first ramp S1 includes an offset Vc0, which is a predetermined value.

As shown in FIG. 6, at the beginning of each switching cycle, the first ramp S1 starts from t0 and ramps up until the first ramp S1 reaches the error amplifier output voltage Vc at t2. The first ramp S1 is reset at t2 and starts to ramp up at the beginning of the next cycle. The operation of the high-side switch Q1 is controlled by the first ramp S1. In particular, the high side switch Q1 is turned on at t0 and remains on until the peak value of the first ramp S1 is equal to the error amplifier output voltage Vc at t2. The low-side switch Q2 is turned on at t2 and remains on until the end of the switching period at t3.

The second ramp S2 does not include an offset and starts from zero as shown in FIG. 6. At the beginning of each switching cycle, the second ramp S2 starts to ramp up and the low-side switch Q4 of the boost converter portion is turned on. The low-side switch Q4 of the boost converter portion remains on until the peak value of the second ramp S2 is equal to the error amplifier output voltage Vc. As shown in FIG. 6, at t1, the low-side switch Q4 is turned off and the second ramp S2 is reset to zero. At t1, the high-side switch Q3 is turned on and remains on until the end of the cycle at t3.

From t0 to t1, since both Q1 and Q4 are turned on, the input voltage Vin is applied to the inductor L1. As a result, the inductor current ramps up from a negative value to a peak current from t0 to t1. The slope of the inductor current is equal to the input voltage Vin divided by the inductance of L1.

During the period from t1 to t2, Q4 is turned off and Q3 is turned on. Since both Q1 and Q3 are on, the voltage difference between Vo and Vin is applied to the inductor L1. Since the output voltage of the buck-boost converter 100 is greater than the input voltage of the buck-boost converter 100, the inductor current ramps down during the period from t1 to t2 as shown in FIG. 6.

During the period from t2 to t3, Q1 is turned off and Q2 is turned on. Since both Q2 and Q3 are on, the output voltage Vo is applied to the inductor L1. As a result, the inductor current ramps down. The ramp-down slope of the inductor current is equal to the output voltage Vo divided by the inductance of L1. At time instant t3, the inductor current drops to the current threshold iLth2. Q3 is turned off and Q4 is turned on.

It should be noted a delay time td may be added as shown in FIG. 6. For example, in order to have a fixed switching frequency, the delay time td may be added at t3. In other words, both the buck ramp and the boost ramp may not ramp up at t3. Instead, the buck ramp and the boost ramp may start at the end of the delay time td.

In the digital control domain, the control mechanism shown in FIG. 6 is similar to that shown in FIG. 4 except that tc is equal to Yn divided by S2 and to is equal the difference of Yn and Yn0 divided by S1.

It should be noted FIG. 6 illustrates a non-ZVS turn-off zone for Q1. The non-ZVS turn-off zone for Q1 shown in FIG. 6 is similar to that shown in FIG. 4, and hence is not discussed herein to avoid repetition.

Figure 7:
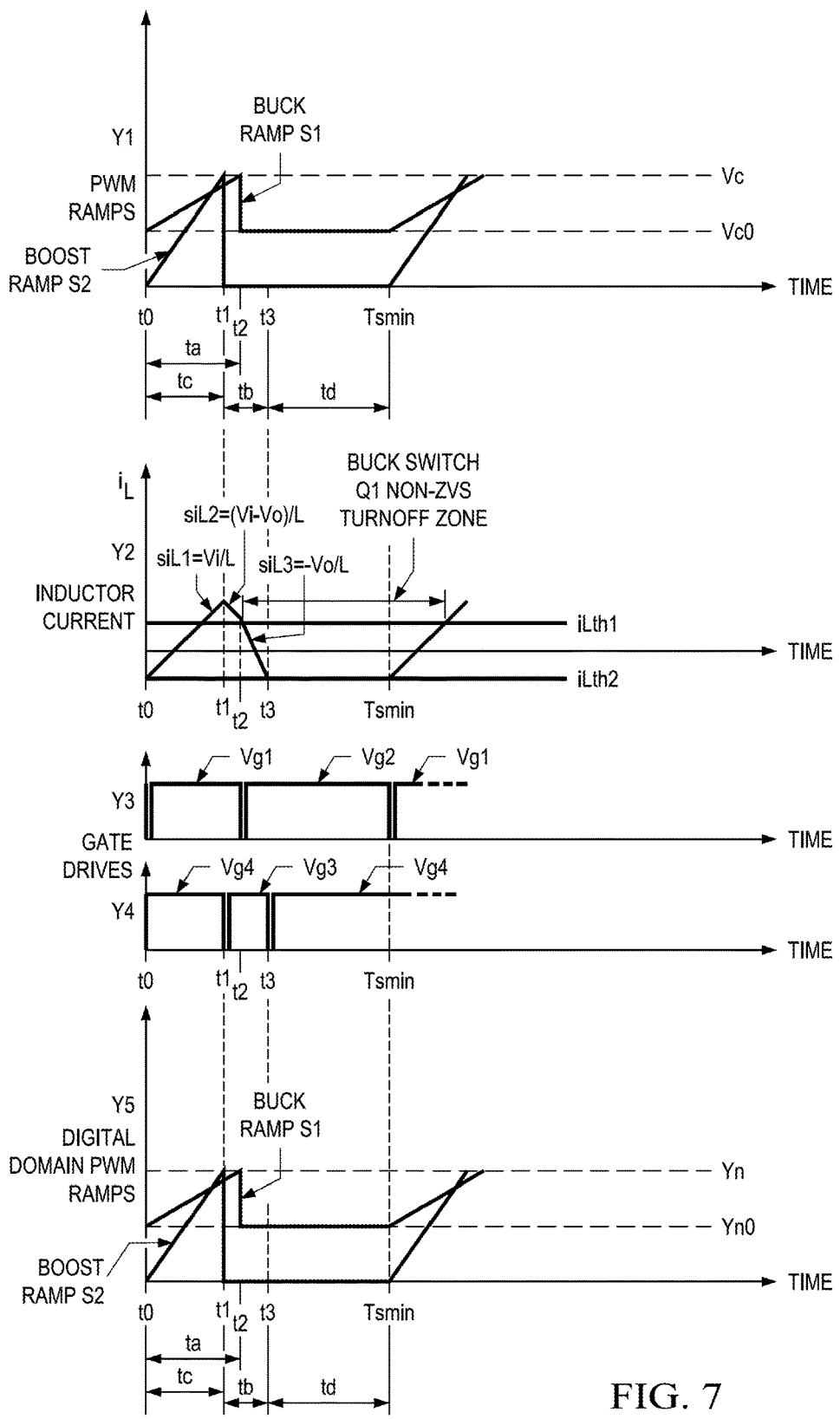
FIG. 7 illustrates timing diagrams associated with a light-load buck-boost operating mode under the second control mechanism when the output voltage is greater than the input voltage in accordance with various embodiments of the present disclosure.

FIG. 7 illustrates timing diagrams associated with a light-load buck-boost operating mode under the second control mechanism when the output voltage is greater than the input voltage in accordance with various embodiments of the present disclosure. The timing diagrams shown in FIG. 7 are similar to those shown in FIG. 6 except that the buck-boost converter 100 operates in a light load condition. Since the inductor current ramp-up slope and the inductor current ramp-down slope are the same as those shown in FIG. 6, the switching period under the light load condition is short in comparison with that shown in FIG. 6 in order to achieve a lower average current flowing through the inductor L1. As a result, the effective switching frequency of the buck-boost converter 100 is relatively high.

In order to control the range of the switching frequency, a minimum switching period Tsmin may be employed. As shown in FIG. 7, the second ramp S2 does not start to ramp until Tsmin. During the period from t3 to Tsmin, it is a delay time td in which Q2 and Q4 are on and remain the on state until the end of the switching cycle.

In the digital control domain, the control mechanism shown in FIG. 7 is similar to that shown in FIG. 4, and hence is not discussed herein to avoid repetition. The non-ZVS turn-off zone for Q1 shown in FIG. 7 is similar to that shown in FIG. 4, and hence is not discussed herein to avoid repetition.

Figure 8:
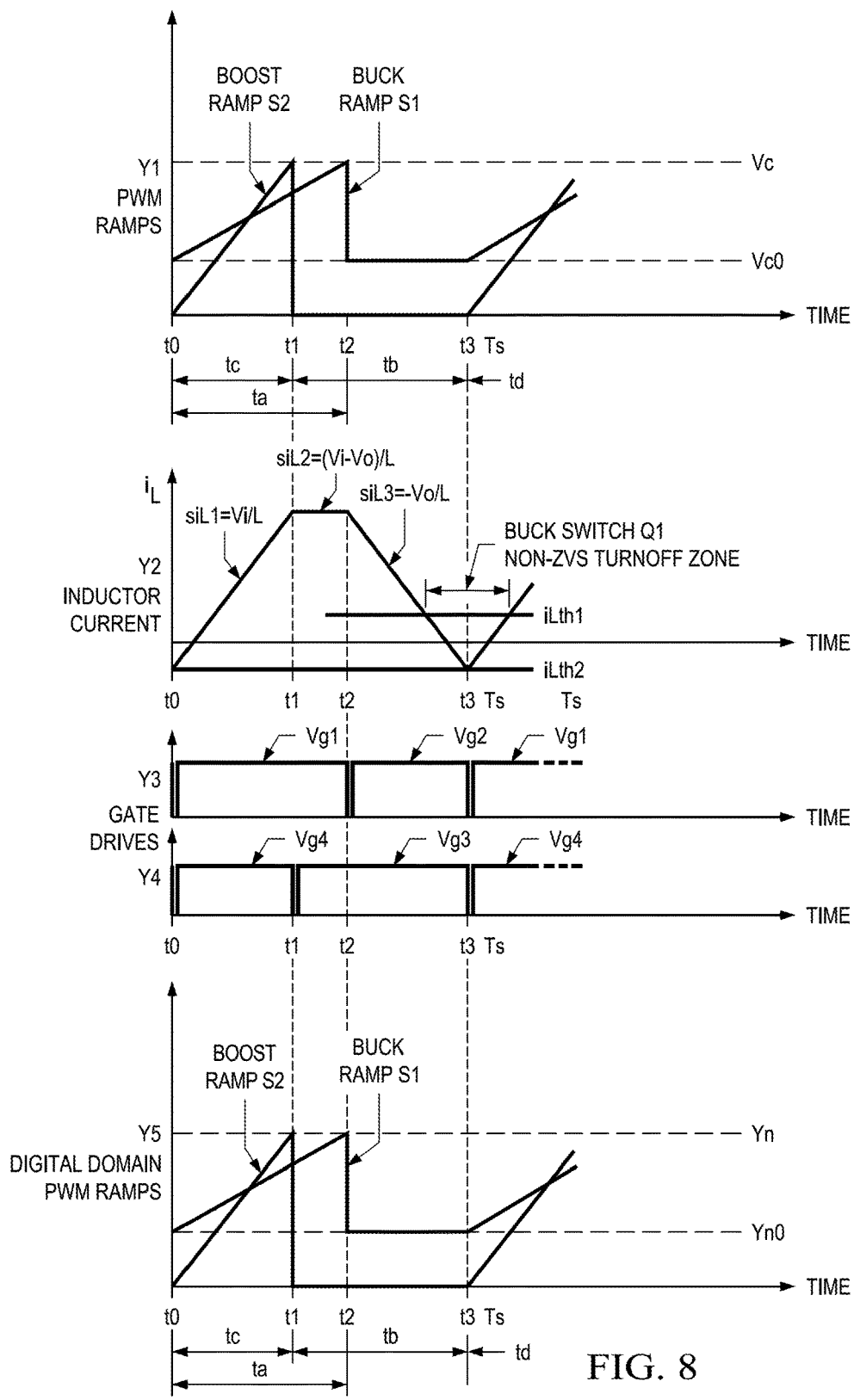
FIG. 8 illustrates timing diagrams associated with a buck-boost operating mode under the second control mechanism when the output voltage is approximately equal to the input voltage in accordance with various embodiments of the present disclosure.

FIG. 8 illustrates timing diagrams associated with a buck-boost operating mode under the second control mechanism when the output voltage is approximately equal to the input voltage in accordance with various embodiments of the present disclosure. In operation, each new switching cycle starts at the time instant t0. At t0, both the high-side switch Q1 of the buck converter portion and the low-side switch Q4 of the boost converter portion are turned on. As shown in FIG. 8, at the beginning of each switching cycle, the first ramp S1 ramps up from Vc0 until the first ramp S1 reaches the error amplifier output voltage Vc at t2. The first ramp S1 is reset at t2 and starts to ramp up at the beginning of the next cycle at t3.

The operation of the high-side switch Q1 is controlled by the first ramp S1. In particular, the high-side switch Q1 is turned on at t0 and remains on until the peak value of the first ramp S1 is equal to an error amplifier output voltage Vc at t2. The low-side switch Q2 is turned on at t2 and remains on until the end of the cycle at t3.

The second ramp S2 does not include an offset and starts from zero as shown in FIG. 8. At the beginning of each switching cycle, the second ramp S2 starts to ramp up and the low-side switch Q4 of the boost converter portion is turned on. The low-side switch Q4 of the boost converter portion remains on until the peak value of the second ramp S2 is equal to the error amplifier output voltage Vc. As shown in FIG. 8, at t1, the low-side switch Q4 is turned off and the second ramp S2 is reset to zero. At t1, the high-side switch Q3 is turned on and remains on until the end of the cycle at t3.

From t0 to t1, since both Q1 and Q4 are turned on, the input voltage Vin is applied to the inductor L1. As a result, the inductor current ramps up from a negative value to a peak current from t0 to t1. The slope of the inductor current is equal to the input voltage Vin divided by the inductance of L1.

During the period from t1 to t2, Q4 is turned off and Q3 is turned on. Since both Q1 and Q3 are on, the voltage difference between Vo and Vin is applied to the inductor L1. Since the input voltage of the buck-boost converter is approximately equal to the output voltage of the buck-boost converter, the inductor current remains relatively flat during the period from t1 to t2 as shown in FIG. 8.

During the period from t2 to t3, Q1 is turned off and Q2 is turned on. Since both Q2 and Q3 are on, the voltage Vo is applied to the inductor L1. As a result, the inductor current ramps down. The ramp-down slope of the inductor current is equal to the output voltage Vo divided by the inductance of L1. At time instant t3, the inductor current drops to the current threshold iLth2. Q3 is turned off and Q4 is turned on.

It should be noted a delay time td may be added as shown in FIG. 8. For example, in order to have a fixed switching frequency, the delay time td may be added at t3. In other words, both the buck ramp and the boost ramp may not ramp up at t3. Instead, the buck ramp and the boost ramp may start at the end of the delay time td.

In the digital control domain, the control mechanism shown in FIG. 8 is similar to that shown in FIG. 4, and hence is not discussed herein to avoid repetition. The non-ZVS turn-off zone for Q1 shown in FIG. 8 is similar to that shown in FIG. 4, and hence is not discussed herein to avoid repetition.

Figure 9:
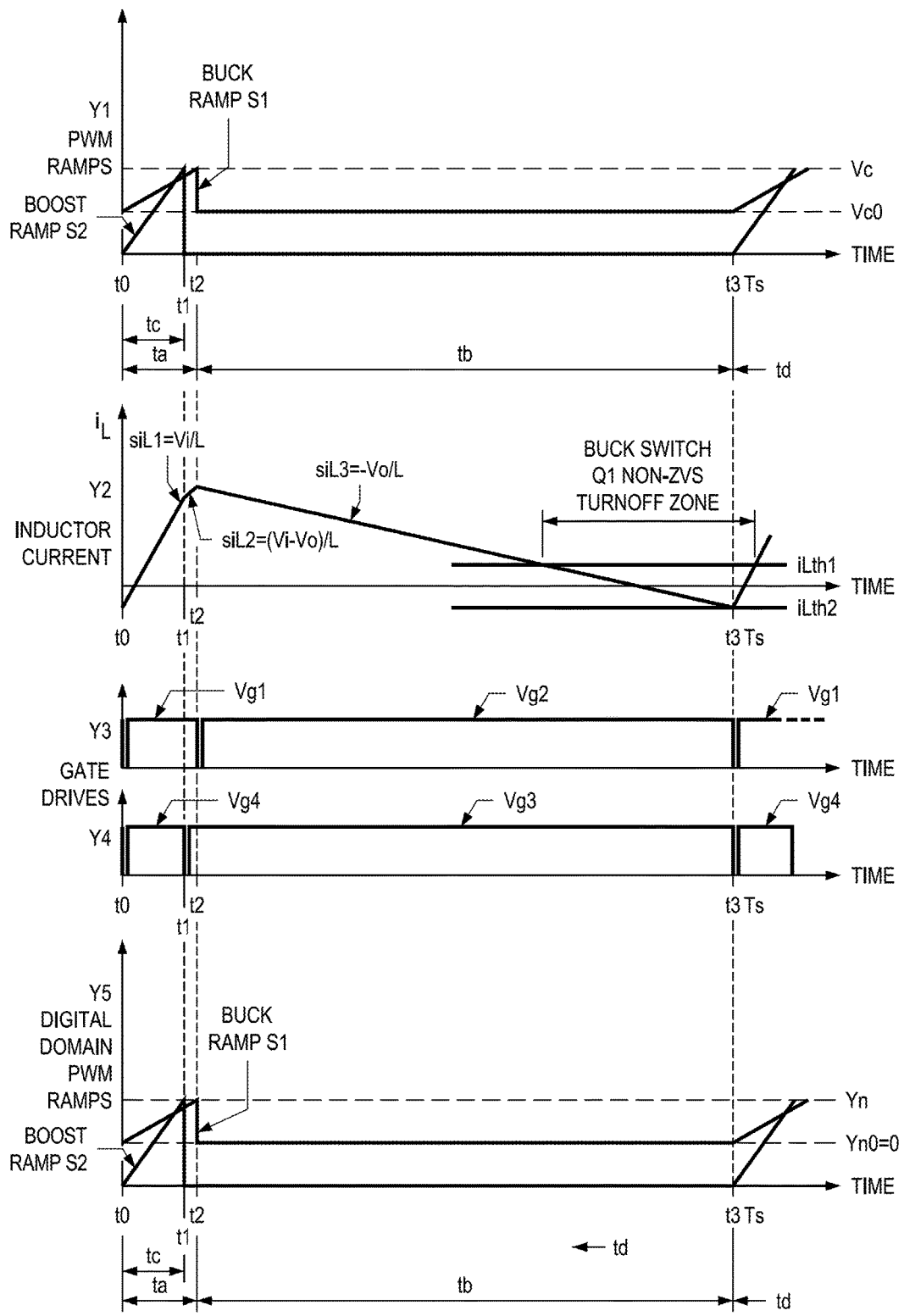
FIG. 9 illustrates timing diagrams associated with a buck-boost operating mode under the second control mechanism when the input voltage is greater than the output voltage in accordance with various embodiments of the present disclosure.

FIG. 9 illustrates timing diagrams associated with a buck-boost operating mode under the second control mechanism when the input voltage is greater than the output voltage in accordance with various embodiments of the present disclosure. In operation, each new switching cycle starts at the time instant t0. At t0, both the high-side switch Q1 of the buck converter portion and the low-side switch Q4 of the boost converter are turned on. As shown in FIG. 9, at the beginning of each switching cycle, the first ramp S1 ramps up from Vc0 until the first ramp S1 reaches the error amplifier output voltage Vc at t2. The first ramp S1 is reset to Vc0 at t2 and starts to ramp up at the beginning of the next cycle. The operation of the high-side switch Q1 is controlled by the first ramp S1. In particular, the high-side switch Q1 is turned on at t0 and remains on until the peak value of the first ramp S1 is equal to the error amplifier output voltage Vc at t2. The low-side switch Q2 is turned on at t2 and remains on until the end of the cycle at t3.

The second ramp S2 does not include an offset and starts from zero as shown in FIG. 9. At the beginning of each switching cycle, the second ramp S2 starts to ramp up and the low-side switch Q4 of the boost converter portion is turned on. The low-side switch Q4 of the boost converter remains on until the peak value of the second ramp S2 is equal to the error amplifier output voltage Vc. As shown in FIG. 9, at t1, the low-side switch Q4 is turned off and the second ramp S2 is reset to zero. At t1, the high side switch Q3 is turned on and remains on until the end of the cycle at t3.

From t0 to t1, since both Q1 and Q4 are turned on, the input voltage Vin is applied to the inductor L1. As a result, the inductor current ramps up from a negative value to a peak current from t0 to t1. The slope of the inductor current is equal to the input voltage Vin divided by the inductance of L1.

During the period from t1 to t2, Q4 is turned off and Q3 is turned on. Since both Q1 and Q3 are on, the voltage difference between Vo and Vin is applied to the inductor L1. Since the input voltage is greater than the output voltage of the buck-boost converter 100, the inductor current keeps ramping up with a lower slope value during the period from t1 to t2 as shown in FIG. 9.

During the period from t2 to t3, Q1 is turned off and Q2 is turned on. Since both Q2 and Q3 are on, the voltage Vo is applied to the inductor L1. As a result, the inductor current ramps down. The ramp-down slope of the inductor current is equal to the output voltage Vo divided by the inductance of L1. At time instant t3, the inductor current drops to the current threshold iLth2. Q3 is turned off and Q4 is turned on, and a new switching cycle begins.

It should be noted a delay time td may be added as shown in FIG. 9. For example, in order to have a fixed switching frequency, the delay time td may be added at t3. In other words, both the buck ramp and the boost ramp may not ramp up at t3. Instead, the buck ramp and the boost ramp may start at the end of the delay time td.

In the digital control domain, the control mechanism shown in FIG. 9 is similar to that shown in FIG. 4, and hence is not discussed herein to avoid repetition. The non-ZVS turn-off zone for Q1 shown in FIG. 9 is similar to that shown in FIG. 4, and hence is not discussed herein to avoid repetition.

Figure 10:
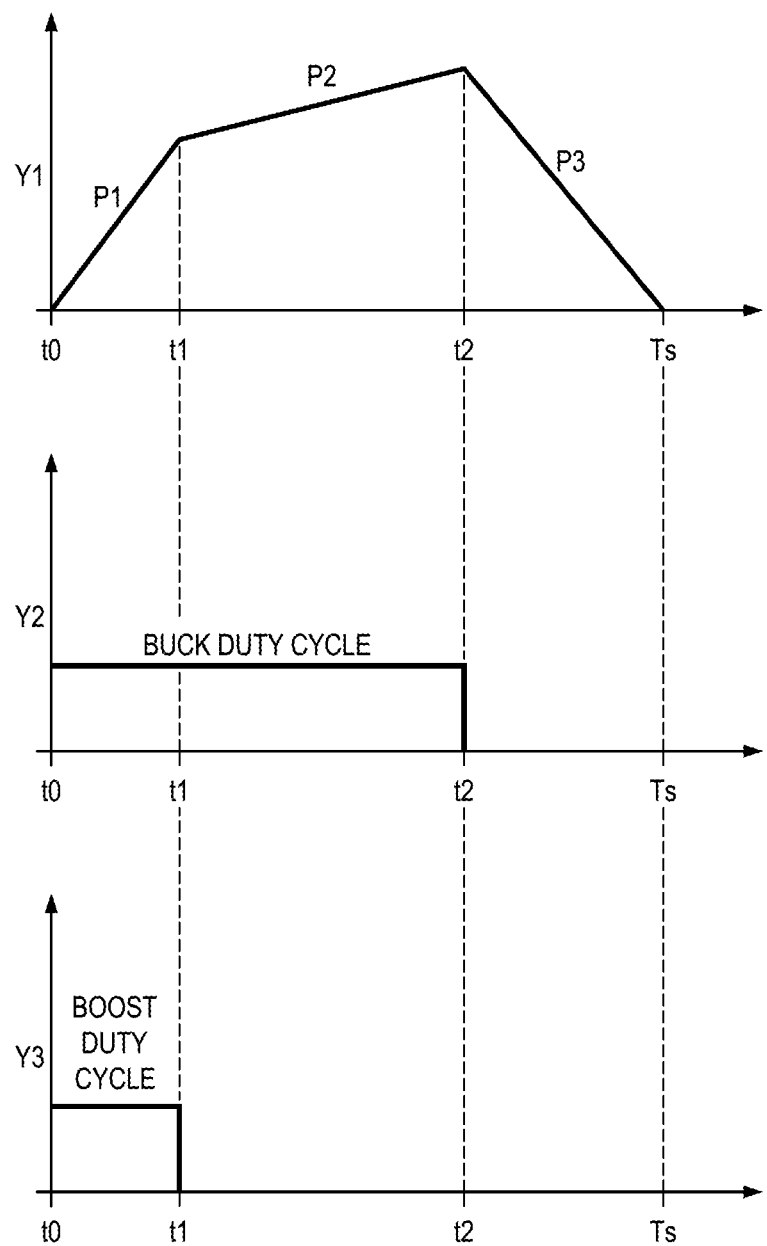
FIG. 10 illustrates timing diagrams associated with the third control mechanism in accordance with various embodiments of the present disclosure.

FIG. 10 illustrates timing diagrams associated with the third control mechanism in accordance with various embodiments of the present disclosure. There are three vertical axes. The first vertical axis Y1 represents three operating phases of the buck-boost converter 100. The second vertical axis Y2 represents the duty cycle of the buck converter portion of the buck-boost converter 100. The third vertical axis Y3 represents the boost converter portion of the buck-boost converter 100.

In the first phase P1, both the high-side switch Q1 of the buck converter portion and the low-side switch Q4 of the boost converter portion are turned on. The slope of the inductor current is equal to the input voltage Vin divided by the inductance of L1.

In the second phase P2, both the high-side switch Q1 of the buck converter portion and the high-side switch Q3 of the boost converter portion are turned on. The slope of the inductor current is equal to the difference of the input voltage Vin and output voltage Vo divided by the inductance of L1.

In the third phase P3, both the low-side switch Q2 of the buck converter portion and the high-side switch Q3 of the boost converter portion are turned on. The slope of the inductor current is equal to the output voltage Vo divided by the inductance of L1.

As shown in FIG. 10, the turning point of the first phase P1 and the second phase P2 is t1. The turning point of the second phase P2 and the third phase P3 is t2. The duty cycle of the buck converter portion is equal to t2 divided by Ts where Ts is the switching period of the buck-boost converter 100. The duty cycle of the boost converter portion is equal to t1 divided by Ts. Ts is determined by the inductor current crossing a predetermined threshold (e.g., iLth2).

Figure 11:
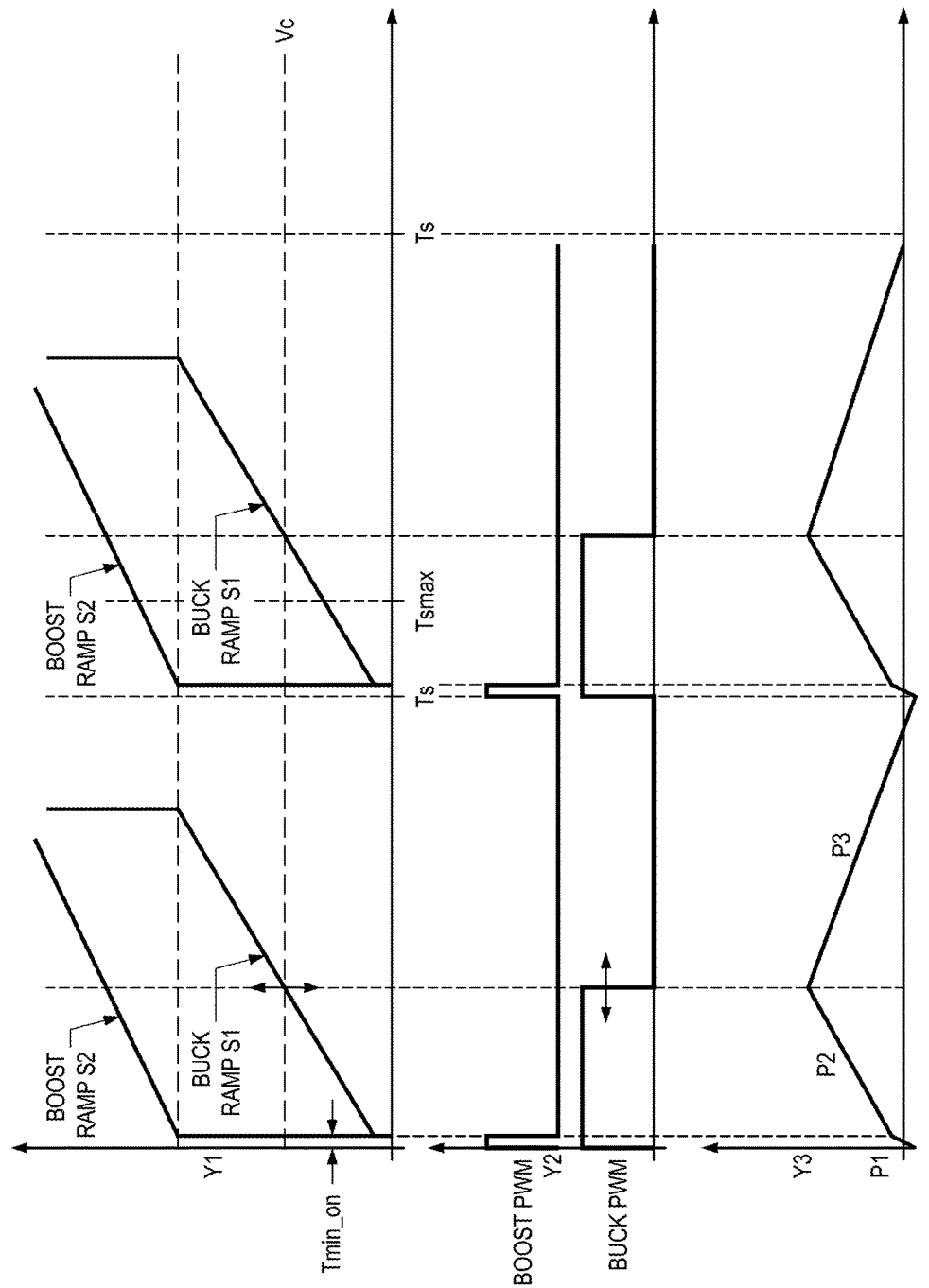
FIG. 11 illustrates timing diagrams associated with a buck operating mode under the third control mechanism shown in FIG. 10 in accordance with various embodiments of the present disclosure.

FIG. 11 illustrates timing diagrams associated with a buck operating mode under the third control mechanism shown in FIG. 10 in accordance with various embodiments of the present disclosure. During the buck operating mode, the boost converter portion operates in a fixed duty cycle mode. The time of the first phase P1 is equal to the minimum on-time of the low-side switch Q4 of the boost converter portion. In some embodiments, the minimum on-time Tmin_on of the low-side switch Q4 is equal to 100 ns.

The duty cycle of the buck converter portion is determined by the intersection point of a buck ramp S1 and an error amplifier output voltage Vc. As shown in FIG. 11, when the buck ramp S1 reaches Vc, the turn-on of Q1 of the buck converter portion terminates. The duty cycle of the buck converter portion is adjustable through varying the error amplifier output voltage Vc as shown in FIG. 11.

Figure 12:
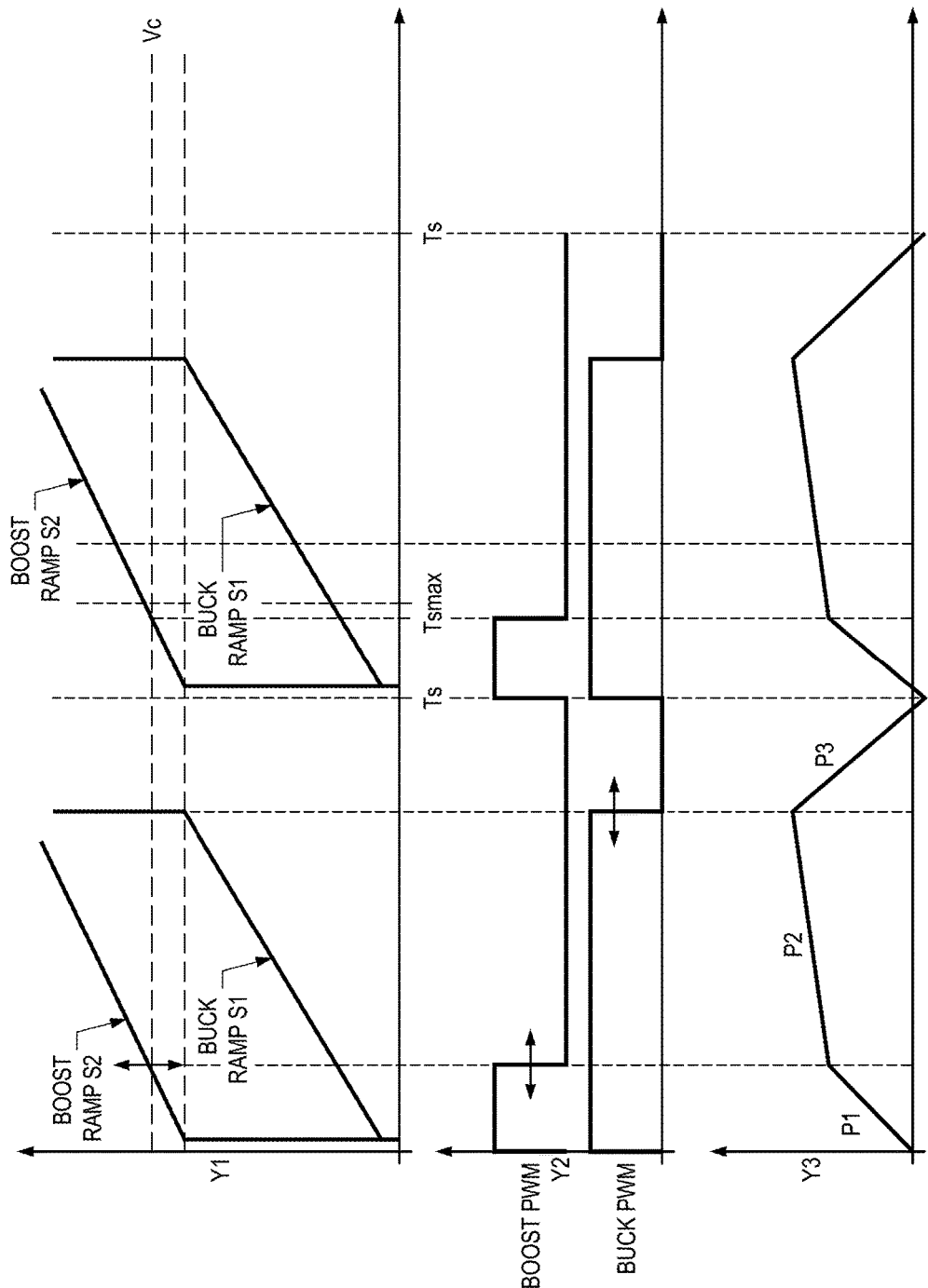
FIG. 12 illustrates timing diagrams associated with a buck-boost operating mode under the third control mechanism shown in FIG. 10 in accordance with various embodiments of the present disclosure.

FIG. 12 illustrates timing diagrams associated with a buck-boost operating mode under the third control mechanism shown in FIG. 10 in accordance with various embodiments of the present disclosure. During the buck-boost operating mode, the duty cycle of the boost converter portion is determined by the intersection point of a boost ramp S2 and the error amplifier output voltage Vc. As shown in FIG. 12, when the boost ramp S2 reaches Vc, the turn-on of the low-side switch Q4 of the boost converter portion terminates. The duty cycle of the boost converter portion is adjustable through varying the error amplifier output voltage Vc as shown in FIG. 12.

The duty cycle of the buck converter portion is determined by a buck ramp S1 and the error amplifier output voltage Vc. As shown in FIG. 12, when the buck ramp S1 reaches Vc, the turn-on of the high-side switch Q1 of the buck converter portion terminates.

Figure 13:
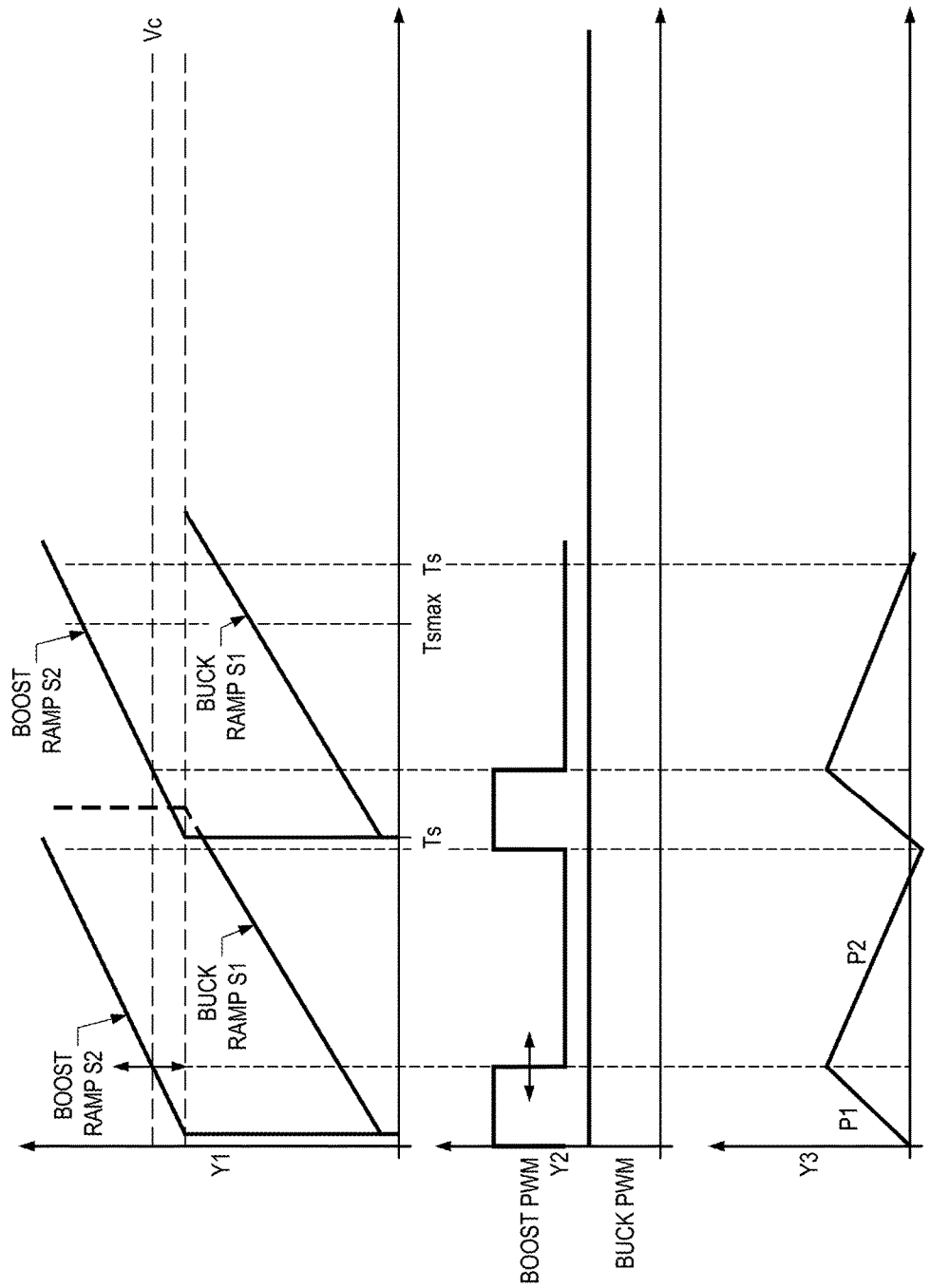
FIG. 13 illustrates timing diagrams associated with a boost operating mode under the third control mechanism shown in FIG. 10 in accordance with various embodiments of the present disclosure.

FIG. 13 illustrates timing diagrams associated with a boost operating mode under the third control mechanism shown in FIG. 10 in accordance with various embodiments of the present disclosure. During the boost operating mode, the duty cycle of the boost converter portion is determined by a boost ramp S2 and the error amplifier output voltage Vc. As shown in FIG. 13, when the boost ramp S2 reaches Vc, the turn-on of the low-side switch Q3 of the boost converter portion terminates. The duty cycle of the boost converter portion is adjustable through varying the error amplifier output voltage Vc as shown in FIG. 13.

The buck ramp S1 never reaches the error amplifier output voltage Vc before the switching cycle ends. Therefore, as shown in FIG. 13, the high-side switch Q1 of the buck converter portion is always on.

In the digital control domain, the error amplifier output voltage Vc shown in FIGS. 11-13 is implemented as Yn. Yn is in a range from 0 to 1. Ts is the switching cycle of the buck-boost converter 100. Depending on different applications and design needs, a mode selection threshold Yth is predetermined. In some embodiments, the mode selection threshold Yth is set to 0.4.

In some embodiments, when Yn is in a range from 0 to Yth, the buck-boost converter 100 operates in the buck operating mode as shown in FIG. 11. The time of the first phase P1 is equal to the minimum on-time Tmin_on of the low-side switch Q4 of the boost converter portion. The time of the second phase P2 is determined by the following equation:

$$P2 = k1 \cdot Yn \cdot Tsmax \tag{1}$$

where k1 is a predetermined constant and Tsmax is the possible maximum switching period. Tsmax is the maximum on time. Tsmax is a fixed value, which is large enough to cover all operation conditions the buck-boost converter 100 may operate.

When Yn is in a range from Yth to 1, the buck-boost converter 100 operates in the buck-boost operating mode shown in FIG. 12. The total time of P1 and P2 is a fixed value. P1 and P2 is determined by the following equation:

$$P1 + P2 = Ton\_min + k1 \cdot Yth \cdot Tsmax \tag{2}$$

where Ton_min is a minimum on-time of the low-side switch Q4 of the boost converter portion.

P1 is controlled by the following equation:

$$P1 = Ton\_min + k2 \cdot (Yn - Yth) \cdot Tsmax \tag{3}$$

where k2 is a predetermined constant and Ton_min is the minimum on-time of the low-side switch Q4 of the boost converter portion.

When Yn goes even higher in the range from Yth to 1, the buck-boost converter 100 will move into the boost operating mode shown in FIG. 13. In particular, when the output voltage Vo of the buck-boost converter 100 is much greater than the input voltage Vin of the buck-boost converter 100, the current flowing through the inductor L1 drops much quicker to the negative current threshold and a new switching cycle begins before the second phase P2 finishes. As a result, the third phase P3 does not exist as shown in FIG. 13. In other words, the buck-boost converter 100 operates in the boost operating mode. On the other hand, when the output voltage Vo of the buck-boost converter 100 is approximately equal to the input voltage Vin of the buck-boost converter 100, the current flowing through the inductor L1 does not reach the negative current threshold during the second phase P2. As a result, the third phase P3 exists as shown in FIG. 12. Thus, the buck-boost converter 100 operates in the buck-boost operating mode. During the buck-boost operating mode, the buck converter portion operates at a duty defined by Equation (2).

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
generating a first ramp signal for controlling a buck converter portion of a buck-boost converter generating a second ramp signal for controlling a boost converter portion of the buck-boost converter;
comparing the first ramp signal and the second ramp signal to a control signal;
controlling a state of a high-side switch of the buck converter portion using the comparing the first ramp signal to the control signal and a state of a low-side switch of the boost converter portion using the comparing the second ramp signal to the control signal;
comparing a current flowing through an inductor of the buck-boost converter to a current threshold, wherein the current threshold is a negative value; and
terminating a switching cycle of the buck-boost converter based upon the comparing the current flowing through the inductor to the current threshold, wherein the current flowing through the inductor changes direction twice during the switching cycle.

2. The method of claim 1, further comprising:
adding an offset into the second ramp signal;
in response to an output voltage greater than an input voltage of the buck-boost converter, turning off the low-side switch of the boost converter portion, turning on a high-side switch of the boost converter portion and resetting the second ramp signal when the second ramp signal is equal to the control signal; and
in response to the output voltage greater than the input voltage of the buck-boost converter, turning off the high-side switch of the boost converter portion and resetting the first ramp signal when the current flowing through the inductor is equal to the current threshold.

3. The method of claim 1, further comprising:
adding a delay time at an end of a switching cycle.

4. The method of claim 3, further comprising:
configuring the buck-boost converter to operate at a fixed switching frequency by adjusting the delay time.

5. The method of claim 1, further comprising:
adding an offset into the second ramp signal;
in response to an output voltage approximately equal to an input voltage of the buck-boost converter, turning off the low-side switch of the boost converter portion, turning on a high-side switch of the boost converter portion and resetting the second ramp signal when the second ramp signal is equal to the control signal;
in response to the output voltage approximately equal to the input voltage of the buck-boost converter, turning off the high-side switch of the buck converter portion, turning on a low-side switch of the buck converter portion and resetting the first ramp signal when the first ramp signal is equal to the control signal; and in response to the output voltage approximately equal to the input voltage of the buck-boost converter, turning off the low-side switch of the buck converter portion and the high-side switch of the boost converter portion, and turning on the high-side switch of the buck converter portion and the low-side switch of the boost converter portion when the current flowing through the inductor is equal to the current threshold.

6. The method of claim 1, further comprising:
adding an offset into the second ramp signal;
in response to an input voltage greater than an output voltage of the buck-boost converter, turning off the high-side switch of the buck converter portion, turning on a low-side switch of the buck converter portion and resetting the first ramp signal when the first ramp signal is equal to the control signal; and
in response to the input voltage greater an output voltage of the buck-boost converter, turning off the low-side switch of the buck converter portion and turning on the high-side switch of the buck converter portion when the current flowing through the inductor is equal to the current threshold.

7. The method of claim 6, wherein:
the offset is greater than the control signal.

8. The method of claim 1, further comprising:
adding an offset into the first ramp signal;
in response to an output voltage greater than an input voltage of the buck-boost converter, turning off the low-side switch of the boost converter portion, turning on a high-side switch of the boost converter portion and resetting the second ramp signal when the second ramp signal is equal to the control signal;
in response to the output voltage greater than the input voltage of the buck-boost converter, turning off the high-side switch of the buck converter portion, turning on a low-side switch of the buck converter portion and resetting the first ramp signal when the first ramp signal is equal to the control signal; and
in response to the output voltage greater than the input voltage of the buck-boost converter, turning off the high-side switch of the boost converter portion and the low-side switch of the buck converter portion, and turning on the low-side switch of the boost converter portion and the high-side switch of the buck converter portion when the current flowing through the inductor is equal to the current threshold.

9. The method of claim 1, further comprising:
adding an offset into the first ramp signal;
in response to an output voltage approximately equal to an input voltage of the buck-boost converter, turning off the low-side switch of the boost converter portion, turning on a high-side switch of the boost converter portion and resetting the second ramp signal when the second ramp signal is equal to the control signal;
in response to the output voltage approximately equal to the input voltage of the buck-boost converter, turning off the high-side switch of the buck converter portion, turning on a low-side switch of the buck converter portion and resetting the first ramp signal when the first ramp signal is equal to the control signal; and
in response to the output voltage approximately equal to the input voltage of the buck-boost converter, turning off the low-side switch of the buck converter portion and the high-side switch of the boost converter portion, and turning on the high-side switch of the buck converter portion and the low-side switch of the boost converter portion when the current flowing through the inductor is equal to the current threshold.

10. The method of claim 1, further comprising:
adding an offset into the first ramp signal;
in response to an input voltage greater than an output voltage of the buck-boost converter, turning off the low-side switch of the boost converter portion, turning on a high-side switch of the boost converter portion and resetting the second ramp signal when the second ramp signal is equal to the control signal;
in response to the input voltage greater than the input voltage of the buck-boost converter, turning off the high-side switch of the buck converter portion, turning on a low-side switch of the buck converter portion and resetting the first ramp signal when the first ramp signal is equal to the control signal; and
in response to the input voltage greater than the input voltage of the buck-boost converter, turning off the low-side switch of the buck converter portion and the high-side switch of the boost converter portion, and turning on the high-side switch of the buck converter portion and the low-side switch of the boost converter portion when the current flowing through the inductor is equal to the current threshold.

11. A method comprising:
detecting an input voltage and an output voltage of a power converter comprising a buck converter portion and a boost converter portion;
comparing a first ramp signal and a second ramp signal to a control signal;
controlling a state of a high-side switch of the buck converter portion using the comparing the first ramp signal to the control signal and a state of a low-side switch of the boost converter portion using the comparing the second ramp signal to the control signal;
determining an operation mode transition based upon a ratio of the input voltage to the output voltage;
comparing a current flowing through an inductor of the power converter to a current threshold; and
terminating a switching cycle based upon the comparing the current flowing through the inductor to the current threshold.

12. The method of claim 11, further comprising:
adding an offset into the second ramp signal; and
configuring the power converter such that:
the high-side switch of the buck converter portion is always on when the output voltage is greater than the input voltage.

13. The method of claim 11, further comprising:
adding an offset into the second ramp signal;
configuring the power converter such that:
the high-side switch of the buck converter portion is turned off and a low-side switch of the buck converter portion is turned on when the first ramp signal is equal to the control signal; and
the low-side switch of the boost converter portion is turned off and a high-side switch of the boost converter portion is turned on when the second ramp signal is equal to the control signal.

14. The method of claim 11, further comprising:
adding an offset into the second ramp signal; and
configuring the power converter such that:
a high-side switch of the boost converter portion is always on when the input voltage is greater than the output voltage.

15. The method of claim 11, wherein:
adding an offset into the first ramp signal;

configuring the power converter such that:
the high-side switch of the buck converter portion is turned off and a low-side switch of the buck converter portion is turned on when the first ramp signal is equal to the control signal; and
the low-side switch of the boost converter portion is turned off and a high-side switch of the boost converter portion is turned on when the second ramp signal is equal to the control signal.

16. The method of claim 15, further comprising:
turning off the low-side switch of the buck converter portion and the high-side switch of the boost converter portion, and turning on the high-side switch of the buck converter portion and the low-side switch of the boost converter portion when the current flowing through the inductor is equal to the current threshold.

17. The method of claim 15, further comprising:
under a light load operating condition, turning off the high-side switch of the boost converter portion when the current flowing through the inductor is equal to the current threshold; and
turning off the low-side switch of the buck converter portion after a delay time from the turning off the high-side switch of the boost converter portion.

18. The method of claim 11, wherein:
the current threshold is a negative value.

19. A converter comprising:
a buck converter portion comprising a first high-side switch and a first low-side switch connected in series across an input capacitor;
a boost converter portion comprising a second high-side switch and a second low-side switch connected in series across an output capacitor;
an inductor coupled between the buck converter portion and the boost converter portion; and
a controller configured to:
generate a first ramp signal for controlling the buck converter portion;
generate a second ramp signal for controlling the boost converter portion;
compare the first ramp signal and the second ramp signal to a control signal;
control a state of the first high-side switch using the comparing the first ramp signal to the control signal and a state of the second low-side switch using the comparing the second ramp signal to the control signal;
compare a current flowing through the inductor to a current threshold; and
terminate a switching cycle based upon comparing the current flowing through the inductor to the current threshold.

20. The converter of claim 19, wherein the controller is configured to:
receive an output voltage of an error amplifier, wherein the error amplifier has a first input coupled to an output voltage of the converter and a second input connected to a reference voltage;
compare an error amplifier output voltage to a voltage threshold;
configure the converter to operate in a buck operating mode when the voltage threshold is greater than the error amplifier output voltage, wherein the boost converter portion operates under a minimum duty cycle;
configure the converter to operate in a boost operating mode when the error amplifier output voltage is greater than the voltage threshold and the output voltage of the converter is greater than an input voltage of the converter, wherein the first high-side switch of the buck converter portion is always on; and
configure the converter to operate in a buck-boost operating mode when the error amplifier output voltage is greater than the voltage threshold and the output voltage of the converter is approximately equal to the input voltage of the converter.

* * * * *